(12) United States Patent
Kimelman et al.

(10) Patent No.: US 7,730,001 B2
(45) Date of Patent: Jun. 1, 2010

(54) COMPUTER SYSTEM PROGRAM AND METHOD TO CHARACTERIZE EACH OF A PLURALITY OF OBJECTS USED AT RUNTIME TO DETERMINE A LOWEST COST PROPERTY AMONG A PLURALITY OF POTENTIAL ALTERNATIVE PROPERTIES FOR EACH OF SAID OBJECTS MINIMIZING TOTAL COST OF INTERACTION AMONG COMPONENTS DURING PROGRAM EXECUTION

(75) Inventors: Douglas N. Kimelman, Hawthorne, NY (US); Vadakkedathu T. Rajan, Briarcliff Manor, NY (US); Tova Roth, Woodmere, NY (US); Vugranam C. Sreedhar, White Plains, NY (US); Mark N. Wegman, Ossinging, NY (US)

(73) Assignee: International Business Machines Corporation, Armonk, NY (US)

( * ) Notice: Subject to any disclaimer, the term of this patent is extended or adjusted under 35 U.S.C. 154(b) by 1468 days.

(21) Appl. No.: 10/073,608

(22) Filed: Feb. 11, 2002

(65) Prior Publication Data

US 2002/0165901 A1    Nov. 7, 2002

Related U.S. Application Data

(60) Provisional application No. 60/267,573, filed on Feb. 9, 2001.

(51) Int. Cl.
G06F 15/18 (2006.01)
G06F 9/44 (2006.01)
G06F 9/445 (2006.01)
G06F 9/45 (2006.01)
G06F 9/50 (2006.01)
G05B 13/00 (2006.01)

(52) U.S. Cl. ............................. 706/13; 700/28; 717/106
(58) Field of Classification Search .................. 706/13; 717/151

See application file for complete search history.

(56) References Cited

U.S. PATENT DOCUMENTS

| | | | | |
|---|---|---|---|---|
| 5,761,670 A | * | 6/1998 | Joy | 707/103 R |
| 5,911,144 A | * | 6/1999 | Schwartz et al. | 707/206 |
| 6,085,196 A | * | 7/2000 | Motoyama et al. | 707/102 |
| 6,112,304 A | * | 8/2000 | Clawson | 713/156 |
| 6,233,621 B1 | * | 5/2001 | Joy | 719/315 |
| 6,381,735 B1 | * | 4/2002 | Hunt | 717/158 |
| 6,629,123 B1 | * | 9/2003 | Hunt | 718/106 |
| 2002/0111697 A1 | * | 8/2002 | Kimelman et al. | 700/5 |

* cited by examiner

*Primary Examiner*—David R Vincent
*Assistant Examiner*—Nathan H Brown, Jr.
(74) *Attorney, Agent, or Firm*—Vazken Alexanian

(57) ABSTRACT

A method is provided for characterizing objects generated during an initial run of a program, each object being characterized by a number of alternative properties which can be chosen. The method includes steps of instrumenting an initial run of program to determine characterization information about each of objects, then determining a desirable property for each object, then determining a correlation between the desirable property and the characterization information for each of the objects. This correlation is then used to select a property for an object that is subsequently created during a run of the program based only upon characterization information about the subsequently created object.

17 Claims, 1 Drawing Sheet

COMPUTER SYSTEM PROGRAM AND METHOD TO CHARACTERIZE EACH OF A PLURALITY OF OBJECTS USED AT RUNTIME TO DETERMINE A LOWEST COST PROPERTY AMONG A PLURALITY OF POTENTIAL ALTERNATIVE PROPERTIES FOR EACH OF SAID OBJECTS MINIMIZING TOTAL COST OF INTERACTION AMONG COMPONENTS DURING PROGRAM EXECUTION

CROSS-REFERENCE TO RELATED APPLICATIONS

This application claims the benefit of U.S. Provisional Application No. 60/267,573, filed Feb. 9, 2001.

The present application is related to the present inventors' applications entitled "Minimizing Interaction Costs Among Components Of Computer Programs" Ser. No. 10/073,628, and "Program Components Having Multiple Selectable Implementations" Ser. No. 10/073,630, which were filed on the same day as the present application. These related applications are incorporated herein by reference.

FIELD OF THE INVENTION

This invention generally relates to the field of optimization of computer programs, and more particularly relates to a computer system that transforms programs so that they run more quickly, but produce the same results by characterizing objects of a program dynamically at runtime.

PRIOR ART

Characterization of objects based on what is known at allocate time to determine what behavior they match from a previous run is not covered very much. But, in the context of garbage collection certain allocation sites have been found to produce data that should be more frequently collected than others in U.S. patent application Ser. No. 10/093,656 by Shuf et al., entitled "A Method For Efficient Memory Management Based On Object Types".

For consistency of definition in the context of the present application, it should be understood that the term "property", with respect to an object or component of a computer program, is broad, and includes narrower terms such as "location", "parameter", and "implementation". In turn, "implementation" includes "data representation" such as "string representation" (e.g. ASCII, EBCDIC, UNICODE) and "data structure" (e.g. hash, tree, compressed). Thus, it will be understood that "implementation" does not encompass "location", nor "parameter" within its meaning. Moreover, in the context of the present invention, "object", "entity", and "component" shall be interpreted as having substantially the same meaning, while "library" shall be understood to mean a group of object definitions or component definitions.

SUMMARY OF THE INVENTION

The present invention broadly provides a method of characterizing objects that are generated during at least a partial run (or, of course, a complete run or multiple runs) of a program, each object being characterized by a plurality of alternative properties, such as string representations (e.g. ASCII, EBCDIC, UNICODE) or data structures (e.g. hash table, tree, compressed) which can be selected. Preferably, such alternative properties may be defined in the object. The aforesaid method comprises:

a) instrumenting the aforesaid at least partial run of said program to determine characterization information about each of said objects. The characterization information may, for example, be the object's class, classification of said object's creator object, or the code identification of the object's creation.

b) determining a desirable property for the aforesaid objects.

c) determining a correlation between the aforesaid desirable property and the aforesaid characterization information for each of the objects; and d) using that correlation to select a property for an object that is subsequently created during an at least partial run of the program based upon characterization information about the subsequently created object.

Preferably, the determining of a desirable property in step (b) is carried out by minimizing total cost of interaction among components during at least a partial run of the program. This may be done by using the minimization and OAG (Object Affinity Graph) graph cutting techniques of our U.S. patent application Ser. No. 10/073,628 and three U.S. patent application Ser. No. 09/676,423 by Rajan et al, Ser. No. 09/676,424 by Wegman et al, and Ser. No. 09/676,425 by Roth et al, all filed on Sep. 29, 2000. It may also be determined in other ways, as by assessing the costs of a particular property without referring to interaction costs, For example, the cost of an insert into a tree is more than the cost of an insert into a hash table. Preferably, one should take into account both types of cost.

The invention also provides a computer readable medium including computer instructions executable on a computer for carrying out the method which has been described hereinabove.

BRIEF DESCRIPTION OF THE DRAWINGS

To describe the foregoing and other exemplary purposes, aspects, and advantages, we use the following detailed description of an exemplary embodiment of the invention with reference to the drawing, in which.

DESCRIPTION OF THE PREFERRED EMBODIMENTS

Figure 1:
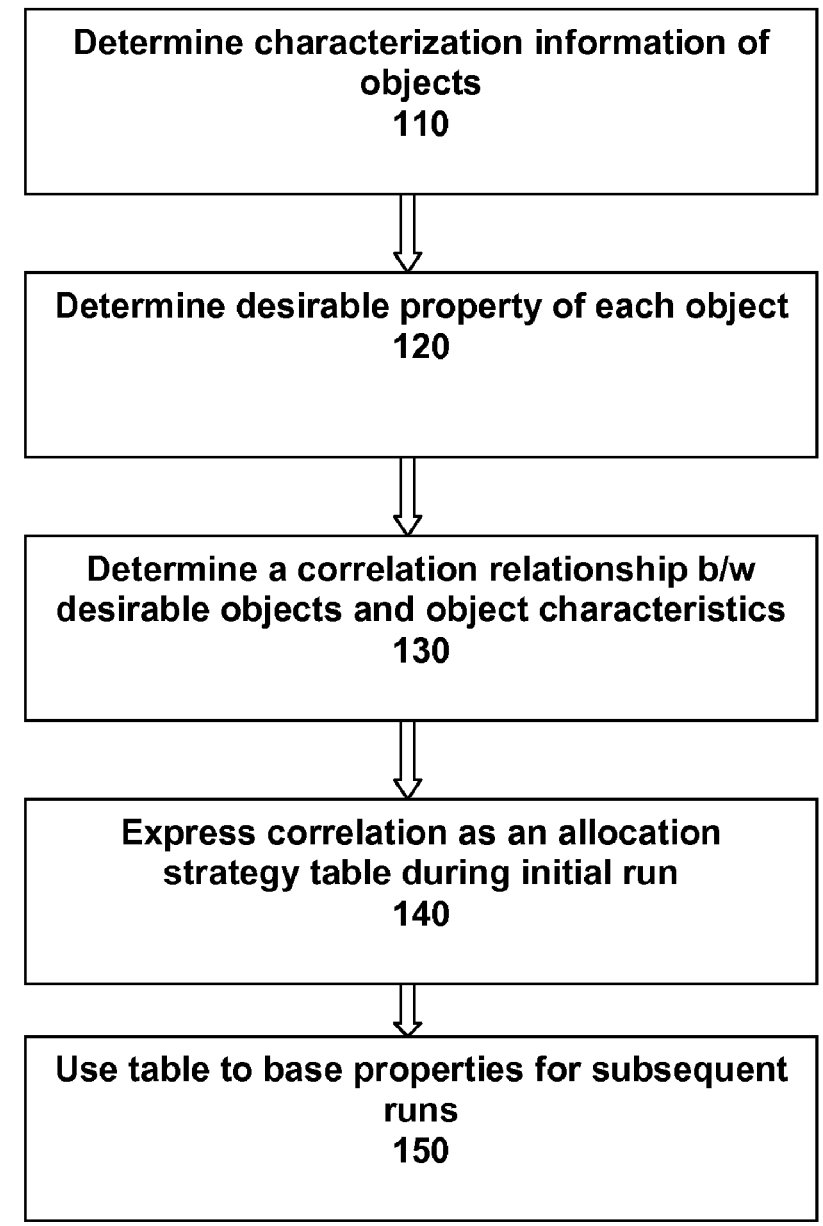
FIG. 1 is a flow chart of a method according to an embodiment of the present invention.

When a program creates a different set of objects on each run we need to determine for each of the new objects what property it should use on this run based on the information in the profiling run. Because the property of an object for its lifetime in this embodiment is determined at create time we can only use characteristics of the object and its creation available at create time. One may call this problem the characterization problem.

At create time we know the allocation site of an object. Objects created in one part of the program may be used quite differently from objects created in a different part, so allocation site may provide a critical clue as to how the object will be used. If the creation is by a clone operation we can know the property of the cloned object. In that case there is no coercioncost for the clone operation, if the cloned object used the same property as the object it is cloned from. If creation is by a new function, which has arguments, we can know the value and property of the arguments. Experiments have shown that often an object interacts heavily with one of its arguments and so the coercioncosts rise if they are different. There are other types of information which can be gathered at create time. For example, for a distributed program where one object is created by another object and the creating object ("creator") is located on a particular machine, it may be beneficial for the new object to be on the same (creator's) machine. Thus, the location of the creator is useful characterization information.

There are two possible problems that may be faced in getting to the optimal partition based on the characterization. One is that we might not be able to determine the best strategies from the information available, and the other is that we might not have enough information.

On the assumption that we have enough information to characterize an object and get good performance, a simple greedy algorithm can be used to do that characterization. To simplify the algorithm we will assume that it is sufficient to use allocation site and the property of the object that is being cloned. Moreover, we will assume that when we use the property of the object being cloned we are only using it so that the created object has the same property. The algorithm illustrates one way to choose properties when those properties may depend on other choices of properties that need to be made.

The goal of the algorithm is to determine a set of characteristics for objects that on the profiling run would have resulted in objects having the property determined by the partitioning in the previous sections. If this goal is not achievable then we seek the characterization which gives as good a set of properties as possible.

One algorithm for this combinatorial optimization problem is a simple greedy one, starting with a partitioning of the objects based on their optimal property in the profile run, as described in the previous sections. As we determine that certain characteristics should determine an object's property we will move those objects that have the same characteristics to the same partition of the OAG (Object Affinity Graph), as described in three U.S. patent application Ser. No. 09/676,423 by Rajan et al, Ser. No. 09/676,424 by Wegman et al, and Ser. No. 09/676,425 by Roth et al, all filed on Sep. 29, 2000. That may be less than the optimal determined by the partitioning algorithm, but we may have no choice.

II. First, we measure the costs over and above the previous partition of the strategy of assigning all objects allocated at one site to the same fixed property and letting the remaining objects stay where they were in the earlier partition.

III. Next, we measure the costs for all objects created at one clone statement of giving those object (clonee's) the same property as the object (cloner) they are cloned from. One may do this either by moving the clonee to the partition of the cloner or by moving the cloner to the clonee's partition (whichever is cheapest) while leaving all other objects in their previous partition.

IV. Then, find the allocation site and strategy with the minimal cost computed above, move all objects created at that site (or their cloner) to the partition determined by that strategy and use this as a new partition. Then, repeat until all allocation sites have a strategy.

According to a preferred embodiment of the present invention, a computer system and method determines object characterizations that can be used at runtime to recognize groups of objects efficiently, as the objects are created, in repeated runs of an object-oriented programs. Referring now to the flow chart 100 of FIG. 1, the preferred approach adopted here staffs at step 110, from at least a partial run of program comprising groups of objects, to determine their characterization information, or object characteristics, such as 'class name' and 'object creator', which are known to be easy to determine for any given object during object creation at runtime. In step 120, a desirable property of each object is then determined, as by the cost minimization methods discussed hereinabove. Next in step 130, a correlation relationship is determined between the desirable property and the object characteristics. The preferred method may, for example, in step 140, express this correlation as a combination of object characteristics that can be used to distinguish objects that are correlated with a desirable property, from all of the other groups, and from the rest of the object population. A preferred method of expressing this correlation is by generating a correlation table. Then, in step 150, subsequent runs will base selection on this table.

According to a simple example of the method of the present invention, consider the case of a program for placing orders (i.e. objects) for products against inventory which may be found in two warehouses (i.e. properties, being "Warehouse 1" and "Warehouse 2"). Each order/object is characterized by a class and a creator. For example, the class may be "Large" or "Small", while the creator may be "Terminal 1" or "Terminal 2".

According to step 110 of the method of the present invention, the program (e.g. SpecJBB2000) is run and monitored by using, for example, Jinsight to determine the class (Large or Small) and creator (Terminal 1 or Terminal 2) for each order/object.

According to step 120 of the present method, a desirable property was next determined for each of the orders/objects. For example, such a desirable property (choice of Warehouse 1 or Warehouse 2) could be based on minimum cost of filling the orders/objects during the run, as by filling each order at only one warehouse, without having to fill the balance of an order at the other warehouse.

According to step 130 a correlation is determined between the desired property (choice of warehouses) and the characterization information (i.e. Class—Large or Small and Creator—Terminal 1 or 2). This correlation can be expressed in various ways, one of which could be a table, as in step 140, that relates class and creator to the most desirable (lowest cost) choice of property (warehouse) during the initial run. Such a table could be:

1 CLASS.backslash.CREATOR TERMINAL 1 TERMiNAL 2 LARGE WAREHOUSE 1 WAREHOUSE 2 SMALL WAREHOUSE 2 WAREHOUSE 1

According to step 150 properties of subsequent orders/objects would be based on the above correlation table using class and creator of the subsequent order/object. Thus, a subsequent Small order from Terminal 2 would be first implemented (filled) at Warehouse 1, while a Large order from Terminal 2 would be filled at Warehouse 2.

For other examples, inputs and outputs could be treated as follows: Input: The communication graph of a distributed object-oriented program as well as a partitioning of the graph, as described in three U.S. patent application Ser. No. 09/676,423 by Rajan et al, Ser. No. 09/676,424 by Wegman et al, and Ser. No. 09/676,425 by Roth et al, all filed on Sep. 29, 2000, giving a desired/initial allocation of objects to machines. In addition, for each object in the graph, its class and its creator must be given.

Output: An allocation strategy table, as described above.

1. Label each instance of every class with the machine to which it was initially allocated.
2. Initialize the allocation strategy table to contain all of the classes, and to give their allocation strategy as 'none'.

3. For each class:
   3.1 If all instances of the class have been allocated to the same machine, set the allocation strategy for that class to be "Allocate all instances of this class to <that machine>".
   3.2 Otherwise, if each instance of the class has been partitioned onto the machine of its creator, then set the allocation strategy for that class to be "Allocate each instance of this class to the same machine as its creator".
4. Until the allocation strategy has been set for all remaining classes in the table, do:
   4.1 For each class C that has no allocation strategy so far, do:
      4.1.1 For each machine M containing one or more instances of class C, do:
         4.1.1.1 Calculate the cost of allocating all of the instances of class C to machine M. In this computation, the cost denotes the increase in overall communication costs due to having instances of class C allocated to machine M instead of their present machine. The instances of the class are not actually moved; just the cost that would arise from having them allocated differently is computed. All instances of classes other than C are assumed to stay in the same place.
      4.1.2 Determine the cost of allocating each instance of this class to the same machine as its creator.
      4.1.3 Determine which of the above computations (4.1.2 and each 4.1.1.1) incurs the minimum cost.
      4.1.4 Thus, we have calculated the cost of each possible allocation strategy for class C (based on the current, but not necessarily final, allocation of the instances of all of the other classes), and we have determined which possible allocation strategy results in the minimum cost increase—regard that strategy as "the potential allocation strategy" for class C.
   4.2 Among all of the classes C having no allocation strategy so far, pick the one whose potential allocation strategy has the minimum cost increase overall, and accept its potential allocation strategy as its actual final allocation strategy (if more than one potential allocation strategy has the minimum cost, choose one arbitrarily).
   4.3 Commit the allocation strategy of this class by entering it into the table, and actually move its instances in the partitioned graph so as to conform to this allocation strategy. If the allocation strategy committed for this class is "Allocate each instance of this class to the same machine as its creator", then link each instance of this class with its creator so that in the future, if a creator is moved so is the linked instance of this class.

The preferred embodiments of the present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the property of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include nonvolatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer readable storage medium including computer instructions executable on a computer for carrying out a method of
   a) performing an initial run of a program placing orders for products in a computer system, wherein each order is represented by an order object and monitoring the program to determine a class and a creator for each order object;
   b) determining a lowest cost property from a plurality of alternative properties for each of the order objects;
   c) determining a correlation between the property and the class and creator of each order object, and expressing the correlation as a correlation table that relates class and creator to the lowest cost property during the initial run; and
   d) providing subsequent order objects comprising properties based on the correlation table using class and creator.

2. The computer readable medium as set forth in claim 1, wherein the computer instructions further enable the computer to determine the lowest cost property by minimizing total cost of interaction among components during the initial partial run of said program.

3. The computer readable medium as set forth in claim 1, wherein said characterization information of an object comprises at least one of said object's class, classification of said object's creator object, and a code identification of said object's creation site.

4. The computer readable medium as set forth in claim 1, wherein said alternative properties comprise a string representation selected from ASCII, EBCDIC, and UNICODE.

5. The computer readable medium as set forth in claim 1, wherein said alternative properties comprise a data structure selected from hash table, tree, and compressed data structures.

6. A computer system with a computer program that, when being loaded and executed, controls the computer system such that it carries out a method comprising steps of:
   a) instrumenting an initial run of said program to determine characterization information about each of a plurality of objects to be used at runtime to recognize groups of objects efficiently, as the objects are created, in repeated runs of object-oriented programs;

b) determining a lowest cost among a plurality of potential alternative properties for one of said objects;

c) determining a correlation between a lowest cost property and said characterization information associated with the one object;

d) expressing the correlation as an allocation strategy; and e) implementing said allocation strategy to select among the alternative properties for an object subsequently created during the at least partial run of said program based upon characterization information about the subsequently created object; and f) producing a subsequent set of objects comprising the characterization information selected in step e).

7. The system as set forth in claim 6, wherein said characterization information of the object comprises at least one of an object's class, classification of said object's creator object, and a code identification of said object's creation site.

8. The system as set forth in claim 6, wherein said potential alternative properties comprise a string representation selected from ASCII, EBCDIC, and UNICODE.

9. The system as set forth in claim 6, wherein said potential alternative properties comprise a data structure selected from hash table, tree, and compressed data structures.

10. The system as set forth in claim 7 wherein expressing the correlation comprises generating an allocation strategy table that relates the object's class and its creator to the determined lowest cost property during the initial run.

11. The system as set forth in claim 10 wherein the allocation strategy comprises allocating each instance of the object's class to a same machine as its creator if each instance of the object's class has been partitioned onto a machine of its creator.

12. The system as set forth in claim 11 further comprising linking each instance of the object's class with its creator such that the linked instance of said object's class is moved if the creator is moved.

13. A computer system with a computer program that, when being loaded and executed, controls the computer system such that it carries out a method comprising steps of:

a) instrumenting an initial run of said computer program to determine characterization information about each of a plurality of objects to be used at runtime to recognize groups of objects efficiently, as the objects are created, in repeated runs of an object-oriented programs;

b) determining a lowest cost property among a plurality of potential alternative properties for one of said objects;

c) determining a correlation between a lowest cost property and said characterization information associated with the one object;

d) expressing the correlation as an allocation strategy; and e) implementing said allocation strategy to select among the alternative properties for an object subsequently created during the at least partial run of said program based upon characterization information about the subsequently created object; and f) producing a subsequent set of objects comprising the characterization information selected in step e);

wherein the determining of the lowest cost property in step (b) is carried out by minimizing total cost of interaction among components during the initial run of said program.

14. A method for placing orders for products against inventory, said method comprising:

a) performing an initial run of a program for placing orders for products in a computer system, wherein each order is represented by an order object and monitoring the program to determine a class and a creator for each order object;

b) determining a lowest cost property for each of the order objects;

c) determining a correlation between the property and the class and creator of each order object, and expressing the correlation as a correlation table that relates class and creator to the lowest cost property during the initial run; and d) providing subsequent order objects comprising properties based on the correlation table using class and creator.

15. The method of claim 14 wherein the step of determining a lowest cost property comprises determining whether the lowest cost property is delivery from Warehouse 1 or Warehouse 2.

16. The method of claim 14 wherein the step of determining characterization information comprises determining whether the class is large or small and whether the creator is terminal 1 or terminal 2.

17. The method of claim 14 further comprising labeling each instance of every class with the machine to which the class was initially allocated.

* * * * *